Patented Dec. 5, 1950

2,532,374

UNITED STATES PATENT OFFICE 2,532,374

RUBBER-PHENOLIC RESIN COMPOSITION

Alvin F. Shepard, Tonawanda Township, Erie County, and Joseph F. Boiney, Tonawanda, N. Y., assignors to Durez Plastics and Chemicals, Inc., North Tonawanda, N. Y., a corporation of New York No Drawing. Application May 26, 1945, Serial No. 596,076

1 Claim. (Cl. 260—43)

This invention relates to rubber compositions.

One of the objects of the invention is to provide a process and product in accordance with which rubber is cured or vulcanized by the action of a special kind of heat-setting resin, either in the presence or absence of sulfur.

Another object is to provide processes and products whereby and wherein the rubber is temporarily plasticized and then reenforced and vulcanized, the same agent which effects the temporary plasticizing action also acting as a vulcanizing agent.

Generally the objects are to provide processes whereby rubber compositions having improved properties are obtained, and corresponding improved products.

In accordance with the invention a resinous condensation or reaction product is made by reacting a substance selected from the group consisting of raw cashew nut shell liquid, heat treated cashew nut shell liquid and Cardanol with a phenolic body other than said substance. The liquid contained in the husk of the fruit of *Anacardium occidentale* (cashew tree) consists mostly of anacardic acid 1-hydroxy, 2-carboxy, 3-pentadeca-dienyl benzene. This product is readily decarboxylated, i. e., it loses carbon dioxide as, for example, by heating. As it comes on the market, the raw oil is frequently more or less decarboxylated and contains anacardic acid and the product of the decarboxylation which is 1-hydroxy, 3-pentadecadienyl benzene. The raw oil may be given a further heat treatment to produce more extensive decarboxylation and a product known as heat-treated cashew nut shell liquid thus obtained. The raw or specially heat-treated oil may also be given a chemical treatment, e. g., with sulfuric acid and alkyl sulfates and distilled to obtain Cardanol which is similar to 1-hydroxy, 3-pentadecadienyl benzene except that Cardanol has only one double bond in the hydrocarbon side chain. In accordance with the invention any member of the group or mixtures of said members, i. e., raw cashew nut shell liquid, heat-treated cashew nut shell liquid or Cardanol, or mixtures thereof may be used. Anacardic acid may also be used.

For the sake of convenience and simplicity any one of these substances or mixtures thereof will be referred to in the specification as "the oil" or "oil."

The resinous product is capable of transformation by heat, e. g., at ordinary vulcanizing temperatures, into an infusible, insoluble condition. Prior to this transformation and preferably while still in the soluble and fusible (or even liquid) condition, it is intimately incorporated with a rubber or a rubber compound and the resulting composition is heated. Curing of the rubber and transformation of the resinous condensation product occur. The action of the resinous product on the rubber temporarily softens it and greatly facilitates the operations of milling and compounding. However, when curing of the compound takes place, the resin is advanced or transformed from the fusible (or liquid) to the infusible condition, reenforcement and vulcanization occur and improved physical properties are obtained.

In the preparation of the resinous product, the oil may be reacted with phenolic bodies in general. These include not only the genus phenol (e. g., the mono and polyhydroxy substitution products of benzene, naphthalene and anthracene and their homologues), but also condensation products of phenols and aldehydes such as formaldehyde, acetaldehyde, furfural and the like, especially the so-called Novolaks, i. e., phenol resins which per se are permanently soluble and fusible.

The resinous reaction product of oil and phenolic body may be prepared in a liquid form or solid, fusible and soluble condition, capable however of transformation by heating, to the infusible, insoluble condition. There are numerous variants of the specific embodiments of the invention. The oil may be reacted with a phenol or phenolic body and sufficient aldehyde or methylene-containing body to make a reactive or so-called one-stage resin, in liquid or solid fusible form, capable of being advanced or transformed to the infusible condition on heating, or this may be done by first reacting the phenolic body with an aldehyde to form a reactive one-stage resin or methylol compound and the said resin or compound may be reacted with the oil. Preferably, however, a two-stage resin is used, i. e., the cashew nut shell oil and phenolic body (phenol or phenol condensation product) are reacted to form a so-called permanently fusible or non-reactive resinous product, i. e., one which is not per se reactive, i. e., capable of advancement to the infusible condition, but becomes so upon the addition of sufficient hardening agent, e. g., aldehyde or methylene-containing body.

The permanently fusible or liquid resin may be mixed with sufficient aldehyde hardening agent or methylene-containing body to make it reactive and transformable to the infusible condition and the mixture may be compounded with a rubber; or the said resin and the hardening agent may be separately compounded with the rubber.

In accordance with the invention, therefore, a rubber compound is provided containing a reactive resinous reaction product of oil and a phenolic body. The resinous product is endowed with reactivity, i. e., the capacity to advance or change to an insoluble and infusible form on heating, either because sufficient hardening agent is included in the reaction which produces the resin or because said hardening agent is added afterward, to the resin itself or to the rubber compound which contains the resin. This is the meaning of the term "reactive resinous reaction product" or "reactive resin" as used herein.

The compounding may be done in any suitable apparatus, e. g., on ordinary rubber mixing rolls or in a Banbury mixer and any of the usual compounding ingredients included. Because of the plasticizing action of the resin, large proportions of such compounding ingredients may be readily milled in even when the stiff and relatively intractable synthetic rubbers are used. The resin is dispersed throughout the mass of rubber compound and after conversion to the infusible condition acts as a reenforcing agent and the proportion of reenforcing agent normally required may be reduced or eliminated. It has also been found that the reactive resin acts as a vulcanizing agent and although normal proportions of sulfur may be used, it is possible to reduce or even eliminate sulfur.

Owing to the plasticizing action of the resin, the rubber compounds may be molded, extruded or otherwise formed into any desired shapes and cured at the usual vulcanizing temperatures.

The invention furthermore includes the preparation of dispersions or solutions, e. g., in the form of cements, by dispersing or dissolving the reactive resin and rubber in a solvent, mixture of solvents or dispersing medium. Vulcanizing agents, accelerators, fillers, tackifiers, antioxidants and the like may be added to these cements to impart the desired low or high temperature curing properties, tackiness, heat resistance or other special properties to said cements and to the resin-rubber films deposited from them by evaporation.

The principles and scope of the invention will be defined in the claim and further described and illustrated at follows:

*Formation of the resinous product*

*Example 1.*—400 grams of phenol are heated with 400 grams of raw cashew nut shell oil and about 20 grams of stannic chloride at about 130 to 140° C. under reflux for about 15 minutes. The product is then distilled under vacuum to a temperature of about 240° C. and excess phenol removed. The yield of resinous product is about 450 grams.

*Example 2.*—1000 grams of a commercial xylenol fraction boiling at about 206 to 225° C. are mixed with 1000 grams of heat-treated cashew nut shell oil and 69 grams of concentrated sulfuric acid. The mixture is heated to 130° C. and held at that temperature for about 30 minutes. The product is then distilled under vacuum to a temperature of about 260° C. and excess phenol removed. The yield of resinous product is about 1350 grams.

*Example 3.*—100 grams resorcinol and 100 grams of raw cashew nut shell oil are mixed and the mixture is heated to about 315° C. during about 90 minutes. The yield of resinous product is about 177 grams.

*Example 4.*—1500 grams of phenol are mixed with 15 grams concentrated sulfuric acid and 567.5 grams of heat-treated cashew nut shell oil and heated to 98° C. Then 750 grams of commercial formalin solution (37.5% formaldehyde) are added gradually during about three quarters of an hour and the product is refluxed for about 15 minutes. It is then distilled in vacuum to about 220° C. to remove excess unreacted constituents. The yield is about 1625 grams of resinous product.

*Example 5.*—200 grams of dihydroxyl diphenyl methane are mixed with 100 grams of Cardanol. A mixture of 108 grams of concentrated sulfuric acid and 525 grams of glacial acetic acid are added and the product is allowed to stand overnight. It is then heated about 5 hours to about 100° C., poured into 2000 cc. of water and the resin layer separated and washed twice with water. The yield of red, viscous resinous product is about 175 grams.

*Example 6.*—A Novolak resin is first made by reacting 1500 grams of phenol with 750 grams of commercial formalin solution in the presence of about 5 to 15 grams of concentrated sulfuric acid and distilling the product in vacuum until the temperature of the product is about 105° C. Then 567.5 grams of cashew nut shell oil is added to the resulting Novolak resin and the ingredients are reacted by heating to a temperature of about 105–115° C. for about 45 minutes. Finally the product is distilled in vacuum until the resin temperature is about 220° C. Yield 1650 grams.

Any of the resins made in accordance with Examples 1 to 6 may be incorporated with rubber to make a rubber compound to which a hardening agent, e. g., an aldehyde or methylene containing body is added, e. g., hexamethylene tetramine, paraformaldehyde, furfuraldehyde, furfuramide, etc., or these hardening agents may be mixed with the resin and the mixture added to the rubber compound. The proportion of hardening agent will be that needed to convert the resin to the infusible condition upon heating and will therefore vary with the nature of the resin. Generally about 3 to 10 per cent by weight of hardening agent will suffice.

The resins made in accordance with Examples 1 to 6 were made either without any catalyst or by using an acid-reacting catalyst. The reactivity of resins of this type is greatly enhanced by using a hardening agent added thereto or to the rubber compound with which such resins are incorporated. It is, however, possible to react the oil with a phenolic body and sufficient aldehyde or methylene-containing body to produce a resin which is sufficiently reactive so that no hardening agent need be added to enable the resin to be converted to the infusible, insoluble condition when incorporated with the rubber and heated.

Alkaline catalysts are useful in making resins of this type.

It has been found desirable, however, to effect the reaction between the oil and phenolic body by using an acid catalyst (or even no catalyst) to produce a resin, the reactivity of which per se is low, or a resin which per se is permanently fusible and to endow this resin with high reactivity by the use of an extraneous hardening agent (added to the resin or rubber compound with which the resin is incorporated).

*Making and curing the rubber compound*

For purposes of illustration and because the invention is of particular advantage with the polymers and copolymers commonly referred to as synthetic rubbers, the following specific data refers to rubber of that type, it being understood that the invention is applicable to rubber generally.

The resin may be incorporated with the rubber in any suitable mixing apparatus and over a wide range of proportions, e. g., 10 to 900 per cent by weight. Any of the usual compounding ingredients including sulfur, accelerators, etc., may be used. As will subsequently be apparent, the normal proportions of sulfur may be reduced or even entirely eliminated because it has been discovered that the reactive resin is a vulcanizing agent.

Because of the stiffness of the synthetic rubbers, it has been difficult to add sufficient loading on the mill to produce the semi-hard or hard rubber stocks. Such stocks may be readily handled in accordance with the present invention. The resin temporarily plasticizes the compound and facilitates the milling and compounding. However the resin during curing is transformed to the infusible condition, reenforces the rubber and produces stocks having high tensile strength, high hardness, good elongation and good low temperature flexibility together with improved aging properties and heat resistance. Depending on the proportion of resin used, the amount of reenforcing agents, e. g., carbon black, may be decreased or eliminated.

The following data shows the physical properties of a vulcanizate made in accordance with the invention, in relation to a compound containing no resin and one containing a conventional phenol formaldehyde resin. The data in column 1 shows a compound made in accordance with the invention, that in column 2 a compound containing a conventional phenol formaldehyde resin and that in column 3 a compound containing no resin. The resin used in compound 1 is a resin made in the manner shown in Example 6 and mixed with about 10 per cent by weight of hexamethylene tetramine, and the resin used in compound 2 is a conventional one-stage or one-step phenol-formaldehyde resin of the thermosetting type.

| Compound | 1 | 2 | 3 |
|---|---|---|---|
| Rubber (Buna N type) | 100.0 | 100.0 | 100.0 |
| Zinc oxide | 5.0 | 5.0 | 5.0 |
| Fatty acid | 1.5 | 1.5 | 1.5 |
| Sulfur | 1.5 | 1.5 | 1.5 |
| Benzothiazyl disulfide | 1.5 | 1.5 | 1.5 |
| Resin | 50.0 | | |
| Resin | | 50.0 | |

*Physical properties of vulcanizates*

| Compound | 1 | | 2 | | 3 | |
|---|---|---|---|---|---|---|
| Min. cure at 65# steam | 30 | 45 | 30 | 45 | 30 | 45 |
| Tensile strength, p. s. i | 2,300 | 2,500 | 1,050 | 850 | 300 | 330 |
| Ultimate Elongation | 290 | 270 | 580 | 300 | 390 | 440 |
| Hardness, Shore | 91 | 92 | 65 | 65 | 48 | 51 |
| Tensile Strength after aging 70 hrs. in air oven at 100° C | 2,500 | | 1,050 | | 380 | |

The above tests indicate the very decided advantage obtained by the use of the resins of the present invention as compared to a blank (Compound III) and also a formulation containing a conventional phenol-formaldehyde resin (Compound II).

Although in the above example the particular rubber used was a copolymer of the type known as Buna N, the invention may be used to particularly good advantage with that class which may be defined as copolymers of butadiene with substances containing the polymerizable structure $CH_2=C=$ where at least one of the disconnected valencies is attached to an electro-negative group and copolymers of chloro 2, butadiene 1,3, (neoprene), with said substances. It may also be used to advantage with polymers of butadiene or isoprene and polymers of chloro 2, butadiene 1,3. Examples of substances having the said polymerizable structure $CH_2=C=$ are styrene, methyl, vinyl ketone, isobutylene, acrylamide, acrylic and methacrylic esters, vinyl and vinylidene esters and many others. The invention is applicable however to rubber generally, i. e., to the genus rubber and in the examples shown herein any rubber may be substituted for the type specifically shown. There are many species included in that genus. Commercially, those species identified as copolymers of butadiene and acrylic nitrile are important and the invention has been found to be especially advantageous when applied to those species.

As previously mentioned, the resin acts as a vulcanizing agent even in the absence of sulfur. This is shown by the following data. Compounds B, C, D, E, G, I, J, L, M and N were made up using resins of Examples 1 to 6, as indicated.

| Compound | A | B | C | D | E |
|---|---|---|---|---|---|
| Resin Ex. 1 | | 40 | | | |
| Resin Ex. 2 | | | 40 | | |
| Resin Ex. 3 | | | | 40 | |
| Resin Ex. 5 | | | | | 40 |
| Hexa | | 4.2 | 4.6 | 5.6 | 3.2 |
| Hycar OR-25 | 200 | 200 | 200 | 200 | 200 |

| Compound | F | G | H | I | J |
|---|---|---|---|---|---|
| Resin Ex. 3 | | 40 | | 40 | |
| Resin Ex. 6 | | | | | 40 |
| Hexa | | 5.6 | | 5.6 | 3.2 |
| Hycar OS-10 (Buna S type) | 200 | 200 | | | |
| Neoprene | | | 200 | 200 | 200 |

| Compound | K | L | M | N |
|---|---|---|---|---|
| Resin Ex. 3 | | 40 | | |
| Resin Ex. 4 | | | 40 | |
| Resin Ex. 6 | | | | 40 |
| Hexa | | 5.6 | 3.2 | 3.2 |
| Hycar OR-15 | 200 | 200 | 200 | 200 |

These compounds were cured at 100 lbs. steam pressure for the periods shown in the subjoined table and tested with the results shown.

Another compound similarly cured and tested is shown as follows:

| Compound | O | P |
|---|---|---|
| Resin Ex. 6 | 120 | 200 |
| Hexa | 9.6 | 16 |
| Hycar OR-15 | 200 | 200 |

The following table shows the trade-marks mentioned above and the corresponding substances:

| Trade Mark | Substances |
|---|---|
| Hycar OR-25 | Copolymer of butadiene and acrylonitrile. |
| Hycar OS-10 | Copolymer of butadiene and styrene. |
| Hycar OR-15 | Copolymer of butadiene and acrylonitrile. |
| Buna-N | Do. |
| Buna-S | Copolymer of butadiene and styrene. |
| Neoprene | A polymer of chloro-2 butadiene 1,3. |

| Compound | Cure, Min. | Tensile | Elong., Per Cent | Cure, Min. | Tensile | Elong., Per Cent | Cure, Min. | Tensile | Elong., Per Cent |
|---|---|---|---|---|---|---|---|---|---|
| A | 10 | 90 | 350 | 20 | 110 | 300 | 30 | 125 | 295 |
| B | 10 | 225 | 725 | 20 | 440 | 725 | 30 | 585 | 675 |
| C | 10 | 290 | 1,100+ | 20 | 875 | 1,030 | 30 | 850 | 935 |
| D | 10 | 550 | 610 | 20 | 835 | 525 | 30 | 935 | 490 |
| E | 10 | 190 | 1,100+ | 20 | 635 | 1,100+ | 30 | 775 | 1,075 |
| F | 10 | 190 | 720 | 20 | 215 | 570 | 30 | 240 | 480 |
| G | 10 | 300 | 1,500 | 20 | 350 | 680 | 30 | 400 | 450 |
| H | | | | 20 | 780 | 700 | 30 | 690 | 680 |
| I | 10 | 1,090 | 350 | 20 | 1,350 | 370 | | | |
| J | 10 | 1,230 | 330 | 20 | 1,220 | 330 | 30 | 1,170 | 300 |
| K | 10 | 385 | 550 | 20 | 445 | 500 | 30 | 425 | 450 |
| L | 10 | 1,120 | 750 | 20 | 1,160 | 570 | 30 | 1,010 | 500 |
| M | 10 | 1,270 | 720 | 20 | 1,400 | 610 | 30 | 1,230 | 530 |
| N | 10 | 1,150 | 730 | 20 | 980 | 500 | 30 | 1,320 | 480 |
| O | 10 | 2,170 | 275 | 20 | 2,400 | 220 | 30 | 2,630 | 150 |
| P | 10 | 3,200 | 50 | 20 | 3,300 | 45 | 20 | 3,200 | 25 |

What is claimed is:

Process which consists in curing by means of heat a mixture consisting of a normally permanently fusible resinous condensation product of a normally permanently fusible phenol aldehyde resin and a substance of the group consisting of raw cashew nut shell liquid, heat-treated cashew nut shell liquid and Cardanol, a rubbery butadiene acrylonitrile copolymer and hexamethylenetetramine as a hardening agent for the resin, the resin and butadiene acrylonitrile copolymer being used in the proportion of 100 parts by weight of said resin to 100 parts by weight of said copolymer.

ALVIN F. SHEPARD.
JOSEPH F. BOINEY.

REFERENCES CITED

The following references are of record in the file of this patent:

UNITED STATES PATENTS

| Number | Name | Date |
|---|---|---|
| 2,078,617 | Spokes | Apr. 27, 1937 |
| 2,102,130 | Rust | Dec. 14, 1937 |
| 2,170,950 | Novotny | Apr. 29, 1939 |
| 2,310,077 | Harvey | Feb. 2, 1943 |
| 2,325,981 | Sarbach | Aug. 3, 1943 |
| 2,335,603 | Novotny | Nov. 30, 1943 |
| 2,341,115 | Novotny | Feb. 8, 1944 |
| 2,371,870 | Brown | Mar. 20, 1945 |